(12) United States Patent
Standley et al.

(10) Patent No.: US 7,943,041 B1
(45) Date of Patent: May 17, 2011

(54) SYSTEM FOR REMOVING PARTICULATE MATTER FROM WASTEWATER

(76) Inventors: Kurt Standley, Twin Falls, ID (US); Troy Hartzell, Twin Falls, ID (US)

(*) Notice: Subject to any disclaimer, the term of this patent is extended or adjusted under 35 U.S.C. 154(b) by 1040 days.

(21) Appl. No.: 11/747,778

(22) Filed: May 11, 2007

Related U.S. Application Data

(60) Provisional application No. 60/747,015, filed on May 11, 2006.

(51) Int. Cl.
*C02F 1/24* (2006.01)
*C02F 1/52* (2006.01)
*C02F 9/02* (2006.01)
*C02F 9/04* (2006.01)
*C02F 11/14* (2006.01)
*C02F 9/00* (2006.01)
*B01D 21/01* (2006.01)

(52) U.S. Cl. ............ 210/221.1; 210/195.1; 210/200; 210/202; 210/205; 210/206; 210/253; 210/259; 210/295

(58) Field of Classification Search ............ 210/221.1, 210/221.2, 195.1, 200, 202, 205, 206, 253, 210/259, 295
See application file for complete search history.

(56) References Cited

U.S. PATENT DOCUMENTS

| | | | | |
|---|---|---|---|---|
| 3,375,116 A * | 3/1968 | Anthony | | 426/2 |
| 3,645,893 A * | 2/1972 | Rohrer | | 210/666 |
| 4,022,696 A | 5/1977 | Krofta | | |
| 4,724,045 A | 2/1988 | Ackel | | |
| 5,364,529 A | 11/1994 | Morin et al. | | |
| 5,374,358 A | 12/1994 | Kaniecki | | |
| 6,083,286 A * | 7/2000 | Ono | | 44/280 |
| 6,470,828 B1 * | 10/2002 | Townsend et al. | | 119/447 |
| 7,005,068 B2 * | 2/2006 | Hoffland | | 210/603 |
| 7,056,441 B1 * | 6/2006 | Menke et al. | | 210/703 |
| 7,306,731 B1 * | 12/2007 | DeWaard | | 210/607 |
| 2001/0025820 A1 * | 10/2001 | Morse et al. | | 210/724 |
| 2002/0030012 A1 * | 3/2002 | Sullivan et al. | | 210/631 |
| 2002/0195398 A1 | 12/2002 | Morse | | |
| 2003/0201225 A1 * | 10/2003 | Josse et al. | | 210/605 |
| 2004/0060876 A1 | 4/2004 | Tipton | | |
| 2004/0084379 A1 | 5/2004 | Ballard | | |
| 2004/0129642 A1 | 7/2004 | Binot | | |
| 2004/0178152 A1 | 9/2004 | Morse et al. | | |
| 2005/0061750 A1 | 3/2005 | Fabri | | |
| 2005/0109701 A1 | 5/2005 | Morse et al. | | |
| 2005/0279711 A1 * | 12/2005 | Goettert et al. | | 210/703 |

* cited by examiner

*Primary Examiner* — Thomas M Lithgow
(74) *Attorney, Agent, or Firm* — Buchanan Nipper

(57) ABSTRACT

A system for and method of removing particulate material from wastewater discharged from an industrial source. The method using filtration, sedimentation, coagulation and skimming to remove the particulate material from the wastewater.

20 Claims, 2 Drawing Sheets

SYSTEM FOR REMOVING PARTICULATE MATTER FROM WASTEWATER

CROSS-REFERENCE TO RELATED APPLICATIONS

This application claims the priority date of the provisional application entitled SYSTEM FOR REMOVING PARTICULATE MATTER FROM WASTEWATER filed by Kurt Standley and Troy Hartzell on May 11, 2006 with application Ser. No. 60/747,015.

FIELD OF THE INVENTION

The invention relates to generally to a method/system for removing particulate matter from wastewater discharge from an industrial process, and more particularly relates to a system for purifying dairy barn wastewater.

BACKGROUND OF THE INVENTION

A typical dairy has thousands of head of dairy cows. These cows being housed, fed, and milked at the dairy. In such a typical operation, the dairy cows will be held within lots, these lots often having concrete pad portions. The dairy would likewise have a dairy barn/milk room/parlor wherein the twice daily milking of the cows takes place. Such a parlor likewise having a concrete floor.

Diary cows, like any animal, generate a substantial quantity of liquid (urine) and solid (dung) waste. To protect milk quality and for sanitation purposes, the waste with the parlor is frequently washed out, using a spray of water. Likewise, the concrete pad areas in the lot themselves are periodically washed, and further, rainwater serves to run off such surfaces. Such water, whether it be through washing out the parlor, normal diary drainage, washing off the lot surface, and/or rainwater runoff, becomes a source of wastewater effluent within a wastewater management system.

This wastewater effluent containing fibrous materials (loose straw, hay, undigestible materials), urine, solid fecal matter and other materials. As such, this wastewater effluent has an odor and contents which pose a significant environmental risk (bacterial and nutrient load) if left untreated. As a result, dairies typically treat and/or store this wastewater effluent.

An unregulated dairy might merely discharge its wastewater effluent into the environment, thereby causing a major source of pollution to the soil, ground water and/or surface water. Such an action would not be possible under current federal and state regulations. A second way a dairy might handle wastewater effluent would be to store it within lagoons, storage ponds, and other impoundments. A third way would be to apply the wastewater effluent to crops for uptake by the plants of the nutrients contained therein. All three of these methods would result in both a substantial source of odor, as well as the related environmental concerns. Further, such systems can use a considerable amount of water, at a significant cost to a dairy.

SUMMARY OF THE INVENTION

The present invention is a method/system of removing particulate matter from wastewater which is discharged from an industrial process. The method/system comprising a number of steps/elements. First, a source of wastewater effluent is defined. This wastewater effluent following a feed path through the present invention's process. This wastewater effluent originating from a source of wastewater, such as wastewater discharge out of a dairy. Next, the wastewater effluent is screened at a screening station, disposed therein, this screening station configured for filtering large-sized particulate matter from the wastewater effluent.

Next, a first sedimentation station is disposed along the wastewater effluent feed path, this sedimentation station for allowing particulate matter suspended in the wastewater to settle out of the wastewater effluent as the effluent passes there-through. Then, a quantity of the wastewater effluent is removed from the wastewater effluent feed path after the first sedimentation station, this quantity of water then being reused within the industrial process.

The remaining wastewater effluent is then passed through a second sedimentation station which is disposed along the wastewater effluent feed path. This second sedimentation station for allowing particulate matter suspended in the wastewater to settle out of the wastewater effluent. Next, a coagulation station is disposed along the wastewater effluent feed path after the second sedimentation station. At this coagulation station, a coagulant is added to the wastewater effluent to cause suspended particulate matter to form a floc. Next, a skimming station is disposed along the wastewater effluent feed path. At this skimming station the floc is skimmed from the surface of the wastewater effluent. Finally, wastewater effluent passing out of the skimming station is discharged from the wastewater effluent feed path.

Still other features and advantages of the present invention will become readily apparent to those skilled in this art from the following detailed description describing only the preferred embodiment of the invention, simply by way of illustration of the best mode contemplated by carrying out the invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
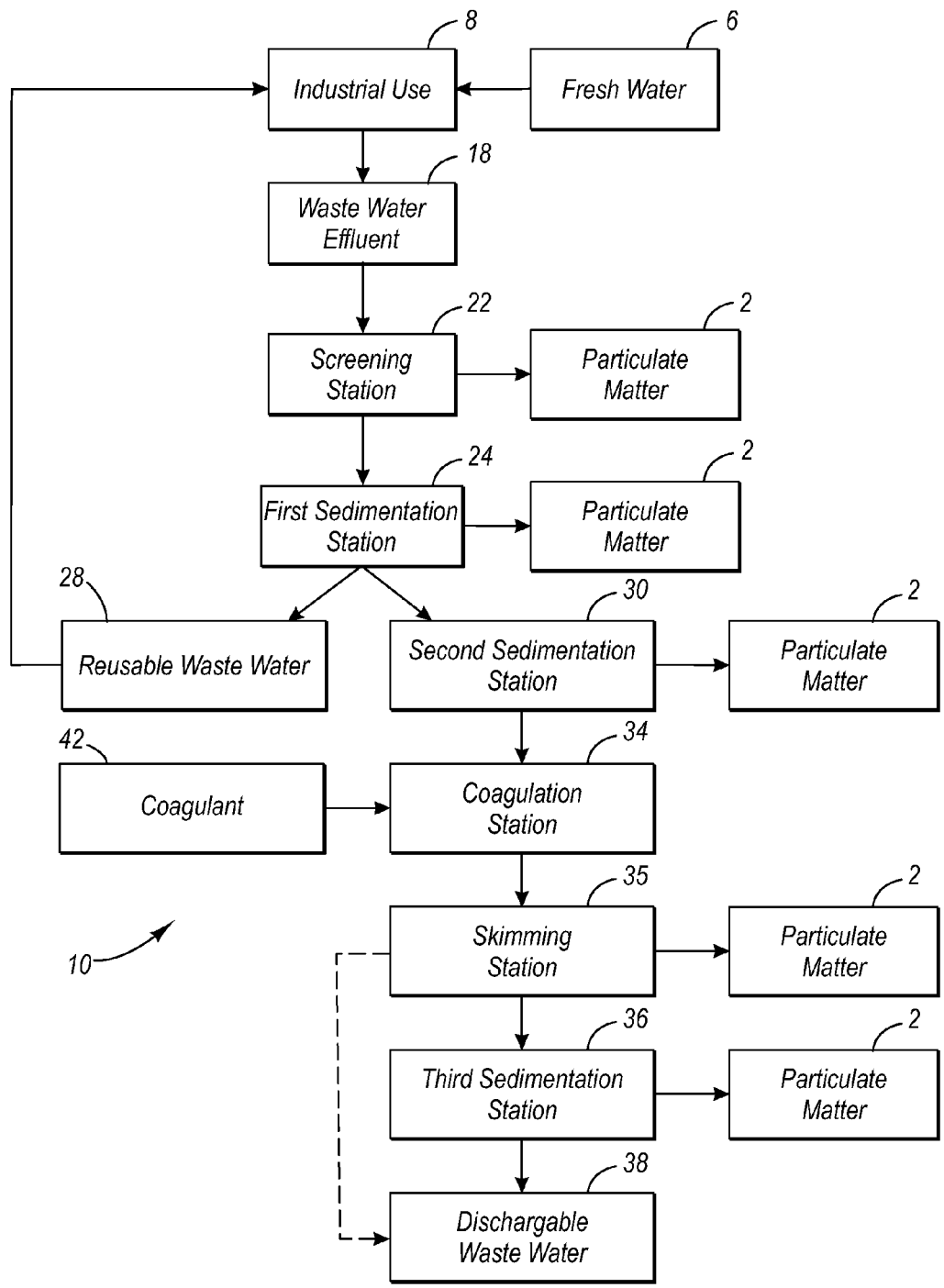
FIG. 1 shows a flow chart illustrating one embodiment of the present invention's process/system.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a method/system of removing particulate matter from wastewater discharged from an industrial process. The term "industrial" being used loosely to represent any process which creates a source of wastewater, including but not limited to industrial operations, agricultural operations, residential and/or commercial surface water run-off, municipal wastewater treatment, etc. Thus, the use of "dairy" herein is not intended to limit the present applications use solely to dairies, but instead to any source of wastewater effluent.

The present invention is a method/system of removing particulate matter from wastewater which is discharged from an industrial process. The preferred embodiment of the present invention is directed towards removing particulate matter from wastewater discharged from a dairy. The present invention comprising both the method of removing particulate matter from wastewater, but also the system/apparatus which is used to accomplish the method.

Figure 2:
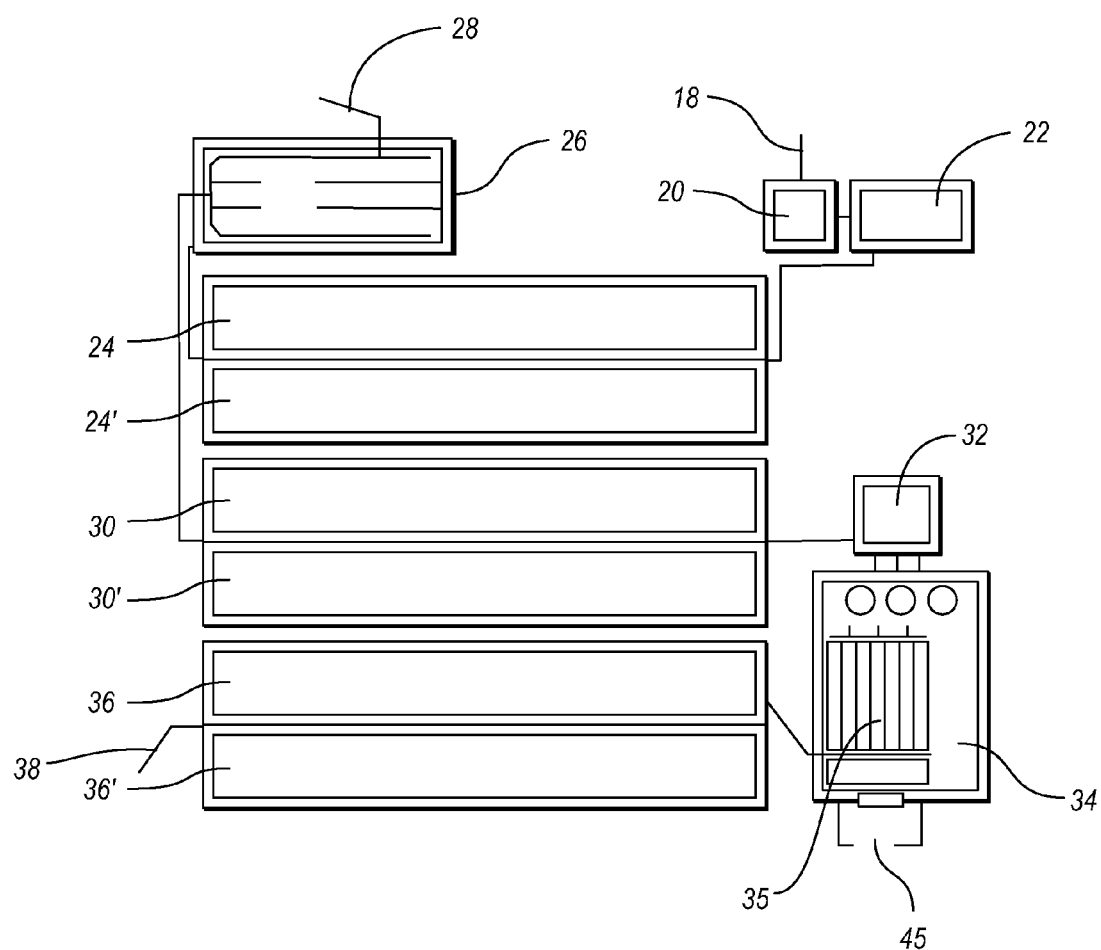
FIG. 2 shows a top plan view of an implementation of a second embodiment of the present invention.

Referring to FIGS. 1 and 2, the system 10 comprising a number of steps. First, a source of wastewater effluent 18 is defined. The wastewater effluent 18 following a feed path through the present invention's process/system. This wastewater effluent 18 originating from a source of wastewater 8, for instance wastewater discharge out of a dairy or other agricultural operation.

It is preferred that the wastewater effluent 18 be then pumped to a screening station 22. This screening station 22 disposed along the wastewater effluent feed path. The screening station 22 configured for filtering large-sized particulate matter from the wastewater effluent 18. For instance, filtering out loose hay, straw, undigestible materials, garbage and any other large-sized particulate matter which may enter into the wastewater management system. In the preferred embodiment, the wastewater effluent 18 is received into a flush reception pit 20 and is pumped into the screening station 22, the screening station 22 having a two-stage separator deck.

This large-sized particulate matter 2 may be further sorted, if necessary, and incorporated within a solids management system/process. For instance, the large-sized particulate matter could be removed and composted. Dairies frequently compost their solid wastes, and such materials could be added into the existing composing system.

Next, it is preferred that a first sedimentation station 24 be disposed along the wastewater effluent feed path. This first sedimentation station 24 for allowing particulate matter suspended in the wastewater to settle out of the wastewater effluent 18 as the effluent passes there-through. In the preferred embodiment, this first sedimentation station 24 comprising a thirty feet wide, four feet deep, two-hundred feet long concrete pit through which the wastewater effluent 18 flows. As such, wastewater effluent tends to pass through the first sedimentation station 24 quite slowly, thereby allowing ample time for the solid materials suspended therein to fall out of suspension and accumulate upon the floor of the first sedimentation station 24.

Obviously, at some point the first sedimentation station will fill (load) with sediment (particulate matter). To with, it is preferred that the first sedimentation station 24 be provided with a pair of parallel sedimentation pits (24, 24'), one of which is in use while the other is drying out and/or draining. Once the sediment dries at least partially out, a front end loader or other apparatus could be used to remove the particulate matter 2 therefrom for use in the composting system discussed previously. Alternating the use of such first sedimentation station pits (24, 24') allows the system 10 to continue uninterrupted.

After passing through this first sedimentation station 24, the wastewater effluent feed path preferably carries the wastewater effluent 18 to a bottoms removal pit 26. The preferred bottoms removal pit 26 being forty feet square, twelve feet deep. Within this bottoms removal pit 26 are a pair of pumps, one tied to a floor lattice (ten feet long PVC pipes having 1.25" holes on four inch centers). The wastewater effluent 18 flowing there-through thus getting additional residency time, thereby allowing additional particulate material to fall out of suspension and accumulate on the bottom of the bottoms removal pit 26. As such, cleaner water resides at the top of the column in the bottoms removal pit 26, and dirtier water (containing more particulate matter) resides at the bottom of the bottoms removal pit 26.

Preferably, a portion of the "cleaner" water 28 in the upper portion of this bottoms removal pit 26 being pumped out of the wastewater effluent feed path. This removed quantity of "cleaner" water 28 then being reused within the industrial process 8, for instance being reused within the dairy barn for hosing down concrete surfaces. By reusing the cleanest water in the system, the industrial process 8 can thereby reduce its consumption of new (fresh) water 6 introduced into the system.

The "dirtier" water in the lower portion of this bottoms removal pit 26 is preferably pumped to a second sedimentation station 30 which is disposed along the wastewater effluent feed path. This second sedimentation station 30 for allowing particulate matter still suspended in the wastewater to settle out of the wastewater effluent 18. In the preferred embodiment, this second sedimentation station 30 comprising a thirty feet wide, four feet deep, two-hundred feet long concrete pit through which the wastewater effluent flows. As such, wastewater effluent 18 tends to pass through the second sedimentation station 30 quite slowly, thereby allowing ample time for the solid materials (particulate material) 2 suspended therein to fall out of suspension and accumulate upon the floor of the second sedimentation station 30.

Obviously, at some point the second sedimentation station will fill with sediment 2. To with, it is preferred that the second sedimentation station be provided with a pair of parallel second sedimentation pits (30, 30'), one of which is in use while the other is drying out and/or draining. Once the sediment 2 dries at least partially out, a front end loader or other apparatus could be used to remove the particulate matter 2 therefrom for use in the composting system discussed previously. Alternating the use of such second sedimentation station pits (30, 30') allows the wastewater treating process to continue uninterrupted. Because the wastewater effluent has already passed through a first sedimentation station (24, 24'), the pit(s) of the second sedimentation station should (in theory) take longer to fill with sediment than that first sedimentation station's pit(s) did.

Next, it is preferred that a coagulation station 34 be disposed along the wastewater effluent feed path after the second sedimentation station (30, 30'). At this coagulation station 34, a coagulant 42 is added to the wastewater effluent 18 to cause suspended particulate matter 2 to form a floc. The wastewater effluent 18 may or may not first pass through as chemical treatment reception pit 32 (preferred size being twenty-five feet square, ten feet deep). The preferred coagulant 42 being ferric sulfate, although other coagulants may be used.

Depending on the time of the year and other conditions, the amount of coagulant used may vary. For instance, if the wastewater effluent's ultimate location is to be storage, more coagulant may be necessary (to remove a maximum amount of suspended particulate matter), whereas if the wastewater effluent's final use is to be crop irrigation, less coagulant could be used, thereby leaving in suspended particulate matter for soil enrichment (fertilizing) purposes.

Next, preferably a skimming station 35 is disposed along the wastewater effluent feed path. At this skimming station 35 the floc is skimmed from the surface of the wastewater effluent 18. In the preferred embodiment, the skimming station 35 having an angular bottom and an associated conveyor belt carrying pads, this conveyor belt for rotating through the water within the skimming station 35 thereby skimming the floc out of the wastewater effluent 18 therein. The floc (particulate matter 2) being collected and disposed of and/or composted.

Next, it is preferred that a third sedimentation station 36 be disposed along the wastewater effluent feed path. This third sedimentation station 36 for allowing particulate matter 2 suspended in the wastewater effluent 18 to settle out of the wastewater effluent 18 as the effluent passes there-through. In the preferred embodiment, this third sedimentation station 36 comprising a thirty feet wide, four feet deep, two hundred feet long concrete pit through which the wastewater effluent 18 flows. As such, wastewater effluent 18 tends to pass through the third sedimentation station 36 quite slowly, thereby allowing ample time for the solid materials 2 suspended therein to fall out of suspension and accumulate upon the floor of the third sedimentation station 36.

Obviously, at some point the third sedimentation station 36 will fill with sediment. To with, it is preferred that the third sedimentation station be provided with a pair of parallel sedimentation pits (36, 36'), one of which is in use while the other is drying out and/or draining. Once the sediment 2 dries at least partially out, a front end loader or other apparatus could be used to remove the particulate matter 2 therefrom for use in the composting system discussed previously. Alternating the use of such third sedimentation station pits allows the present invention 10 to continue uninterrupted.

After passing through this third sedimentation station 36, the wastewater effluent 18 is discharged from the wastewater effluent feed path. This discharge can be dealt with in the standard manner. Examples of such discharge handling include, but are not limited to, irrigating crops with the discharge and storing the discharge in a lagoon or other impoundment. Optionally, the third sedimentation station could not be present and the wastewater effluent could be discharged upon passing out of the skimming station.

The Applicant hereby offers a number of examples of embodiments of the present invention. These examples are not exhaustive nor are they intended to limit the scope of the invention, but are merely provided to present some of the possible embodiments which the present invention could comprise.

Example 1

A system for treating dairy wastewater. The dairy wastewater is screened, thereby removing large sized (fibrous) particulate matter. The wastewater is then transitioned through a first sedimentation station whereby sediment is allowed to fall out of suspension and collect on the bottom of the first sedimentation station. After passing through the first sedimentation station, a quantity of reusable wastewater is extracted therefrom and is reused within the industrial process. The water that is not reused is passed through a second sedimentation station whereby additional time is provided for particulate matter to fall out of suspension. From the second sedimentation station, the water passes to a coagulation station whereby a coagulant is added to the wastewater, thereby causing a floc to form containing sediment. Through use of a skimming station, this floc is removed from the wastewater. From the skimming station, the water then passes through a third sedimentation station whereby additional time is provided for the particulate matter to drop out of suspension. After passing through the third sedimentation station, the water is discharged into the standard matter, for instance, into a reservoir or applied to crops via irrigation.

Example 2

A system for treating dairy wastewater. The dairy wastewater is screened, thereby removing large sized (fibrous) particulate matter. The wastewater is then transitioned through a first sedimentation station whereby sediment is allowed to fall out of suspension and collect on the bottom of the first sedimentation station. After passing through the first sedimentation station, a quantity of reusable wastewater is extracted therefrom and is reused within the industrial process. The water that is not reused is passed through a second sedimentation station whereby additional time is provided for particulate matter to fall out of suspension. From the second sedimentation station, the water passes to a coagulation station whereby a coagulant is added to the wastewater, thereby causing a floc to form containing sediment. Through use of a skimming station, this floc is removed from the wastewater. From the skimming station, the water is discharged into the standard matter, for instance, into a reservoir or applied to crops via irrigation.

Example 3

A system for treating dairy wastewater. The dairy wastewater is screened, thereby removing large sized (fibrous) particulate matter. The wastewater is then transitioned through a first sedimentation station whereby sediment is allowed to fall out of suspension and collect on the bottom of the first sedimentation station. The wastewater is then passed through a second sedimentation station whereby additional time is provided for particulate matter to fall out of suspension. From the second sedimentation station, the water passes to a coagulation station whereby a coagulant is added to the wastewater, thereby causing a floc to form containing sediment. Through use of a skimming station, this floc is removed from the wastewater. From the skimming station, the water is discharged into the standard matter, for instance, into a reservoir or applied to crops via irrigation.

One additional feature of certain embodiments of the present invention is where the industrial use requires the inputting of fresh water into the industrial use. The volume of this fresh water, along with the volume of the reusable wastewater extracted after the first sedimentation station, is generally equal to the volume of the water that is discharged (minus evaporation) from the system so that the total amount of water within the industrial use remains generally constant. By doing this, the industrial use uses less fresh water and is able to conserve natural resources through reusing the cleanest portion of wastewater.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims. The Abstract is neither intended to define the invention, which is measured by the claims, nor is it intended to be limiting as to the scope of the invention in any way.

What is claimed is:

1. A system for removing particulate material from wastewater discharged from an industrial process, said system comprising:
   a) a wastewater effluent feed path containing an introduced wastewater effluent from a source of wastewater;
   b) at least one screening station disposed along said wastewater effluent feed path for filtering large sized particulate material from said wastewater effluent;

c) at least one first sedimentation station disposed along said wastewater effluent feed path for allowing particulate material suspended in said wastewater to settle out of the wastewater effluent;

d) removing a quantity of the wastewater effluent from said wastewater effluent feed path after said first sedimentation station, said quantity of water for reuse in said industrial process;

e) at least one second sedimentation station disposed along said wastewater effluent feed path for allowing particulate material suspended in said wastewater to settle out of said wastewater effluent;

f) a coagulation station disposed along said wastewater effluent feed path after said second sedimentation station for addition of a coagulant to said wastewater effluent to cause suspended particulate material to form a floc; and g) a skimming station disposed along said wastewater effluent feed path after said coagulation station for skimming said floc from the surface of said wastewater effluent;

wherein wastewater effluent passing out of the skimming station is discharged from said wastewater effluent feed path.

2. The system of claim 1, wherein said discharged wastewater effluent is used for irrigation.

3. The system of claim 1, wherein said discharged wastewater effluent is stored in a reservoir.

4. The system of claim 1, wherein the water removed in step (d) is reused in the industrial process.

5. The system of claim 4, wherein the industrial process is a dairy.

6. The system of claim 1, wherein the settled particulate material is removed and composted.

7. The system of claim 1, wherein the coagulant is ferric sulfate.

8. The system of claim 1, wherein said skimming station further comprises a sloped floor portion cooperating with a conveyor belt for skimming the floc from the surface of wastewater effluent held therein.

9. The system of claim 1, further comprising at least one third sedimentation station disposed along said wastewater effluent feed path after said skimming station but before wastewater effluent discharge for allowing particulate material suspended in said wastewater to settle out of the wastewater effluent.

10. The system of claim 1, wherein said industrial use requires the inputting of fresh water into the industrial use, the volume of this fresh water along with the volume of said reusable waste water of step (d) generally equal to the volume of the discharged wastewater effluent so that the amount of water within the industrial use remains generally constant.

11. The system of claim 1, wherein a pair of parallel first sedimentation stations are selectively used, wherein a first of said pair can be removed from said wastewater effluent feed path and the settled particulate material is removed therefrom while said second of said pair is disposed along said wastewater effluent feed path and used for sedimentation purposes.

12. The system of claim 1, wherein a pair of parallel second sedimentation stations are selectively used, wherein a first of said pair can be removed from said wastewater effluent feed path and the settled particulate material is removed therefrom while said second of said pair is disposed along said wastewater effluent feed path and used for sedimentation purposes.

13. The system of claim 1, wherein a pair of parallel third sedimentation stations are selectively used, wherein a first of said pair can be removed from said wastewater effluent feed path and the settled particulate material is removed therefrom while said second of said pair is disposed along said wastewater effluent feed path and used for sedimentation purposes.

14. A system for removing particulate material from wastewater discharged from at least one dairy barn, said system comprising:

a) a wastewater effluent feed path containing an introduced wastewater effluent from a source of wastewater;

b) at least one screening station disposed along said wastewater effluent feed path for filtering large sized particulate material from said wastewater effluent;

c) at least one first sedimentation station disposed along said wastewater effluent feed path for allowing particulate material suspended in said wastewater to settle out of the wastewater effluent;

d) removing a quantity of the wastewater effluent from said wastewater effluent feed path after said first sedimentation station, said quantity of water for reuse within said at least one dairy barn;

e) at least one second sedimentation station disposed along said wastewater effluent feed path for allowing particulate material suspended in said wastewater to settle out of said wastewater effluent;

f) a coagulation station disposed along said wastewater effluent feed path after said second sedimentation station for addition of a coagulant to said wastewater effluent to cause suspended particulate material to form a floc;

g) a skimming station disposed along said wastewater effluent feed path after said coagulation station for skimming said floc from the surface of said wastewater effluent; and h) at least one third sedimentation station disposed along said wastewater effluent feed path after said skimming station for allowing particulate material suspended in said wastewater to settle out of the wastewater effluent;

wherein wastewater effluent passing out of the third elongated sedimentation station is discharged from said wastewater effluent feed path.

15. The system of claim 14, wherein said discharged wastewater effluent is used for irrigation.

16. The system of claim 14, wherein said discharged wastewater effluent is stored in a reservoir.

17. The system of claim 14, wherein the coagulant is ferric sulfate.

18. The system of claim 14, wherein:

a pair of parallel first sedimentation stations are selectively used, wherein a first of said pair of parallel first sedimentation stations can be removed from said wastewater effluent feed path and the settled particulate material is removed therefrom while said second of said pair of parallel sedimentation stations is disposed along said wastewater effluent feed path and used for sedimentation purposes; and a pair of parallel second sedimentation stations are selectively used, wherein a first of said pair of parallel first sedimentation stations can be removed from said wastewater effluent feed path and the settled particulate material is removed therefrom while said second of said pair of parallel sedimentation stations is disposed along said wastewater effluent feed path and used for sedimentation purposes.

19. A system for removing particulate material from wastewater discharged from at least one dairy barn, said system comprising:

a) a wastewater effluent feed path containing an introduced wastewater effluent from a source of wastewater;

b) at least one screening station disposed along said wastewater effluent feed path for filtering large sized particulate material from said wastewater effluent;

c) at least one first sedimentation station disposed along said wastewater effluent feed path for allowing particulate material suspended in said wastewater to settle out of the wastewater effluent;

d) removing a quantity of the wastewater effluent from said wastewater effluent feed path after said first sedimentation station, said quantity of water for reuse within said at least one dairy barn;

e) at least one second sedimentation station disposed along said wastewater effluent feed path for allowing particulate material suspended in said wastewater to settle out of the wastewater effluent;

f) a coagulation station disposed along said wastewater effluent feed path after said second sedimentation station for addition of a coagulant to said wastewater effluent to cause suspended particulate material to form a floc;

g) a skimming station disposed along said wastewater effluent feed path after said coagulation station for skimming said floc from the surface of said wastewater effluent; and h) at least one third sedimentation station disposed along said wastewater effluent feed path after said skimming station for allowing particulate material suspended in said wastewater to settle out of the wastewater effluent;

wherein wastewater effluent passing out of the third sedimentation station is discharged from said wastewater effluent feed path, said discharge into either a reservoir for storage or into an irrigation system for crop irrigation;

a pair of parallel first sedimentation stations are selectively used, wherein a first of said pair of parallel first sedimentation stations can be removed from said wastewater effluent feed path and the settled particulate material is removed therefrom while said second of said pair of parallel sedimentation stations is disposed along said wastewater effluent feed path and used for sedimentation purposes; and a pair of parallel second sedimentation stations are selectively used, wherein a first of said pair of parallel first sedimentation stations can be removed from said wastewater effluent feed path and the settled particulate material is removed therefrom while said second of said pair of parallel sedimentation stations is disposed along said wastewater effluent feed path and used for sedimentation purposes.

20. The system of claim 19, wherein the coagulant is ferric sulfate.

\* \* \* \* \*